3,059,336
DENTAL ALIGNMENT HOLDER FOR USE IN PRODUCING DENTAL RESTORATIONS
August W. Windish, Scarsdale, N.Y., assignor to J. F. Jelenko & Co., Inc., New York, N.Y., a corporation of New York
Filed Apr. 25, 1961, Ser. No. 105,461
11 Claims. (Cl. 32—19)

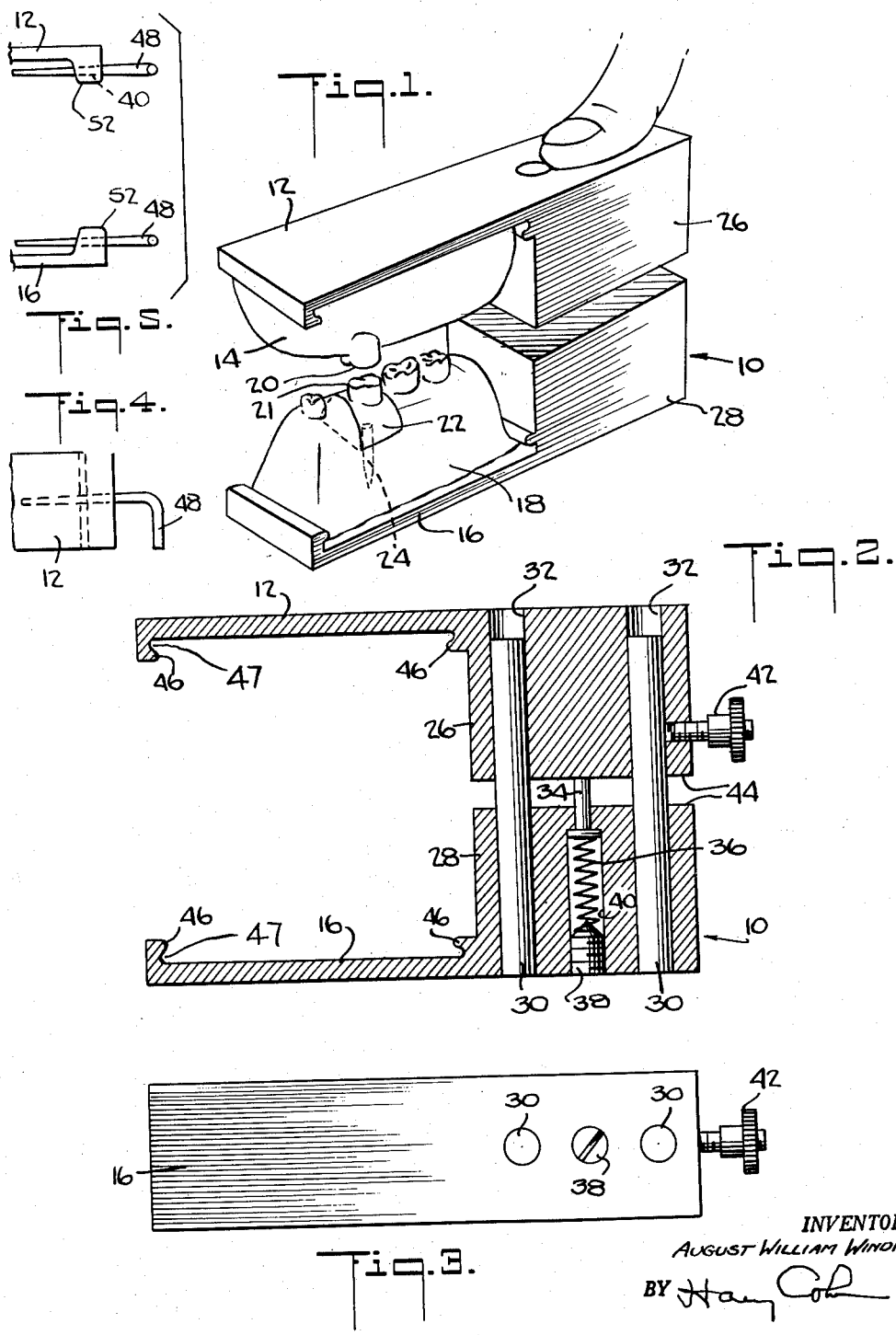

The present invention relates to the production of dental restorations, such as inlays, crowns, bridges, and the like, and more particularly to a dental alignment holder for use in producing such dental restorations pursuant to the principles of the functional bite technique. The invention also relates to a method of producing dental restorations according to this functional bite technique.

According to this technique, a functional bite is chewed in by the dental patient to provide a static record of the dynamic action of the mastication movements of the jaws. This static record of the functional bite of the patient is obtained by the dentist by placing softened dental wax over the prepared teeth and the masticating action of the opposed teeth with respect to the prepared teeth are recorded in wax. From this impression a dynamic record of the functional movements of the opposed teeth is poured in stone and a static functional counter cast or dental functional cast is formed which contains all the movements of mastication such as centric, working lateral, balancing lateral, protrusive, etc. An impression of the prepared teeth is also taken for making a dental working cast which may contain the removable dies which represent the prepared tooth or teeth which are to receive the dental restorations.

The primary object of the present invention is to provide a dental alignment holder and a method of producing dental restorations which utilize the dental working cast and the dental functional cast of the functional bite technique to provide dental restorations having properly formed occlusal surfaces thereon without having had to adjust these surfaces in the patient's mouth.

Another object is to provide a dental alignment holder of relatively simple construction which is especially well suited for use in producing dental restorations in accordance with the above indicated technique.

A further object is to provide a method and apparatus for producing dental restorations which reduce the amount of time required by the dentist for working on the finished dental restorations in the patient's mouth.

The above and other objects, features and advantages of this invention will be fully understood from the following description of the invention considered in connection with the accompanying illustrative drawings.

In the drawings:
FIG. 1 is a perspective view illustrating the method and apparatus of the present invention;
FIG. 2 is a vertical sectional view of the device shown in FIG. 1, on a larger scale;
FIG. 3 is a bottom plan view of the device shown in FIG. 2; and
FIGS. 4 and 5 are views of end portions of the device, showing another form of the invention.

Referring now to the drawings in detail, the dental alignment holder 10 of the present invention comprises an upper arm 12 which is adapted to carry a dental functional cast 14 and is movable relative to a lower arm 16 which is adapted to carry a dental working cast 18. As indicated previously, the functional cast has a portion or surfaces 20 which represent the mastication movements of the teeth or tooth opposite the prepared tooth which is to receive the dental restoration. As herein shown, the working cast 18 has a removable die 22 which carries a part 21 representing the prepared tooth and the cast 18 is provided with a tapered hole into which fits a tapered pin 24 which is secured to the removable die. In this manner the die is always properly positioned in relation to the adjacent teeth and may be readily removed by the dentist or the laboratory technician to be worked on. The casts 18 and 20 are made in dental stone in a well known manner as indicated above.

One end of the upper arm 12 is integral with an enlarged block portion 26 and the corresponding end of the lower arm 16 is integral with a similar block 28. The blocks and arms are preferably made of metal. A pair of guide pins 30 extend upwardly from block 28 into a pair of corresponding guide holes 32 provided in block 26 in which said pins have a close sliding fit so that the arms of the holder are in vertical alignment with each other and are limited strictly to relative rectilinear movement and without lost motion with respect to each other. It is to be noted that the pins and the holes are longitudinally spaced from each other in the direction of the longitudinal extent of the arms. The arms are biased toward their open or retracted positions, as shown, by the spring biased pin 34 which is urged into its extended position by the compression spring 36. A screw retains the spring and pin in the hole 40 provided in block 28 and provides an abutment for one end of the spring. A locking screw 42 is provided in block 26 and is engageable with the outer pin 30 for locking the arms and blocks in their closed position with the confronting surfaces 44 of the blocks in surface-to-surface contact for a purpose which will be explained in detail hereinafter. Each of the arms is provided with the laterally extending projecting ridges 46 which form grooves 47 which help hold the casts 14 and 18 on their respective arms and permit the casts to be slid easily transversely of the arms for removal or mounting.

In using the holder, the dental functional cast 14 and the dental working cast 18 are prepared in the manner indicated above and are sealed to each other in their correct relationship with the surfaces 20 in alignment with the representation 21 of the prepared tooth. The inner surfaces of the mounting arms are covered with a thin coating of a lubricating substance, for example, petroleum jelly, and the sealed casts are disposed between the arms which are then closed so that the confronting surfaces 44 of the two blocks are in contact with each other. In this closed condition the arms are locked with respect to each other by locking screw 42. The sealed casts are then secured to their respective arms by applying a mix of casting stone around their edges and the stone should be allowed to extend over one of the sides of each of the mounting arms to form a stop to relocate the cast should they be removed from their respective arms of the holder. The ridges or beads 46 help secure the casts on the arms. Excess stone from the other side of the arms should be removed so that the casts may be removed from their respective arms by sliding transversely thereof.

After the stone has set, the locking screw 42 is loosened and the upper arm 12 may be removed from the holder. The stone of the functional cast should be trimmed away with a grinding wheel except for the functional surfaces 20 so that when the arms are closed there will be no contact of the stone of the functional cast with any part of the working cast except in the area of the functional surfaces 20.

A wax pattern of the inlay, crown or bridge of the dental restoration, as the case may be, is formed by applying wax to the part 21 of the die representing the prepared tooth and the occlusal surface thereof is provided with an excess amount of wax. While the excess wax is still soft, the arms of the holder are closed by manually pushing down the upper arm, as indicated in FIG. 1, and tapping together repeatedly the confronting surfaces 44 of the blocks. A coating of an indicating material, for example white shoe polish, is applied on the surfaces 20 of the functional cast and this indicates the high spots on the wax pattern as the arms of the holder are tapped together. These high spots are removed by carving and when the confronting surfaces 44 produce a metallic tapping noise such noise is an indication that no excess wax on the occlusal surface of the wax pattern is present and such occlusal surface is of the proper form.

A casting is made from the wax pattern in the usual manner and white shoe polish should be removed from the functional cast and the surfaces 20 painted with mercurochrome, Prussian blue or similar material. In a similar manner as described above the high spots of the occlusal surface of the casting may be readily determined and removed to provide a properly formed occlusal surface of the restoration. Thus it is seen that both the wax pattern and casting are formed with the proper occlusal surface without the necessity of forming the surface in the patient's mouth. The rectilinear movement of the arms with respect to each other and the dynamic record of the mastication movements provided by the surfaces 20 of the functional cast 14 duplicate all of the mastication movements of the patient's jaws and thereby eliminate the necessity of finishing the occlusal surfaces of the restoration in the patient's mouth.

It will be apparent from the above description that the alignment device of the present invention obviates all relative movements of the arms 12 and 16 except the relative strictly-rectilinear movements of said arms for the above described purposes. This enables accurate results to be obtained in the production of the restoration in the laboratory of the technician pursuant to the impressions furnished by the dentist, so that the dentist is relieved of considerable work which he would otherwise be obliged to perform.

As illustrated in FIGS. 4 and 5, the grooves 47 at the outer ends of arms are omitted and in lieu thereof removable tapered pins 48 are insertable through holes 50 in the ribs 52 to hold the casts 14 and 18 releasably in position.

It will be understood from the above that the dental alignment holder of the present invention is utilized to provide properly formed occlusal surfaces for both the wax pattern as well as the dental casting and the reference in the claims to a casting is to be interpreted to include a wax pattern also.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:

1. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, means mounting and supporting said arms for guided relative rectilinear movement only toward and away from each other to bring said surfaces of said functional cast in contact with the occlusal surface of said casting to indicate the high portions thereof, and means associated with said arms for indicating said high portions as a result of said movements and said contact of said functional cast with said casting.

2. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, means mounting and supporting said arms for guided relative rectilinear movement only toward and away from each other to bring said surfaces of said functional cast in contact with the occlusal surface of said casting to indicate the high portions thereof, and means associated with said arms for indicating said high portions as a result of said movements and said contact of said functional cast with said casting, said last mentioned means comprising a member secured to each one of said arms and positioned to engage each other when said functional cast is in contact with said casting and there are no high portions on said casting.

3. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, means mounting said arms for relative rectilinear closing and opening movements toward and away from each other to repeatedly bring said surfaces of said functional cast in contact with the occlusal surface of said casting to indicate the high portions thereof, and means for indicating said high portions as a result of said movements and said contact of said functional cast with said casting comprising a metallic block on each one of said arms and positioned to be in noise producing contact with each other as a result of the movement of said functional cast into contact with said casting when there are no high portions on said casting.

4. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, means mounting said arms for relative rectilinear closing and opening movements only toward and away from each other to repeatedly bring said surfaces of said functional cast into contact with the occlusal surface of said casting to indicate the high portions thereof, and means for indicating said high portions as a result of said movements and said contact of said functional cast with said casting comprising a metallic block on each one of said arms and positioned to be in noise producing contact with each other when said functional cast is moved into contact with said casting when there are no high portions on said casting.

5. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, means mounting said arms for repetitive relative movement with said casts in confronting relation comprising cooperating means on each of said arms for restricting said relative movement to rectilinear closing and opening movements only whereby said casts are moved toward and away from each other to repeatedly bring said surfaces of said functional cast into contact with the occlusal surface of said casting to indicate the high portions thereof, a metallic block on each one of said arms and having confronting surfaces, respectively, which are in surface-to-surface contact during the closed positions of said arms when there are no high portions on said casting to thereby indicate the presence or absence of said high portions.

6. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, and means mounting said arms for repetitive relative movement with said casts in confronting relation comprising a pair of pins extending from one of said arms and a pair of corresponding holes in the other of said arms for receiving said pins, said pins and holes being spaced longitudinally of each other, respectively, in the direction of the longitudinal extent of said arms, spring means biasing said arms into said spaced condition, said arms being manually movable into a closed condition to bring said surfaces of said functional cast in contact with the occlusal surface of said casting to indicate the high portions thereof.

7. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, means mounting said arms for repetitive relative movement with said casts in confronting relation comprising a pair of pins extending from one of said arms and a pair of corresponding holes in the other of said arms for receiving said pins, said pins and holes being spaced longitudinally of each other, respectively, in the direction of the longitudinal extent of said arms, spring means biasing said arms into said spaced condition, said arms being manually movable into a closed condition to bring said surfaces of said functional cast in contact with the occlusal surface of said casting to indicate the high portions thereof, and means associated with said arms for indicating said high portions as a result of said movements and said contact of said functional cast with said casting.

8. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, means mounting said arms for repetitive relative movement with said casts in confronting relation comprising a pair of pins extending from one of said arms and a pair of corresponding holes in the other of said arms for receiving said pins, said pins and holes being spaced longitudinally of each other, respectively, in the direction of the longitudinal extent of said arms, spring means biasing said arms into said spaced condition, said arms being manually movable into a closed condition to bring said surfaces of said functional cast in contact with the occlusal surface of said casting to indicate the high portions thereof, and means associated with said arms for indicating said high portions as a result of said movements and said contact of said functional cast with said casting, said last mentioned means comprising a member secured to each one of said arms and positioned to engage each other when said functional cast is in contact with said casting and there are no high portions on said casting.

9. A dental alignment holder for use in the production of dental restorations, comprising an arm for supporting a dental working cast representing a portion of the patient's teeth prepared for receiving a dental restoration and having a casting mounted thereon of said dental restoration, another arm confronting and spaced from said first mentioned arm for supporting a dental functional cast having surfaces representing the mastication movements of the teeth opposite the prepared teeth, means mounting said arms for repetitive relative movement with said casts in confronting relation comprising a pair of pins extending from one of said arms and a pair of corresponding holes in the other of said arms for receiving said pins, said pins and holes being spaced longitudinally of each other, respectively, in the direction of the longitudinal extent of said arms, spring means biasing said arms into said spaced condition, said arms being manually movable into a closed condition to bring said surfaces of said functional cast in contact with the occlusal surface of said casting to indicate the high portions thereof, and means associated with said arms for indicating said high portions as a result of said movements and said contact of said functional cast with said casting, said last mentioned means comprising a metallic block on each one of said arms and having confronting surfaces, respectively, which are in surface-to-surface contact during the closed position of said arms when there are no high portions on said casting to thereby indicate the presence or absence of said high portions.

10. A method of producing dental restorations, comprising providing a dental alignment holder having a pair of spaced arms mounted for relative rectilinear opening and closing and closing movement with respect to each other, mounting on one of said arms a dental working cast representing a portion of the patient's teeth prepared for receiving a dental restoration and having a casting mounted thereon of said dental restoration, mounting on the other of said arms a dental functional cast in alignment with said working cast and having surfaces representing the mastication movements of the teeth opposite the prepared teeth, coating said surfaces of said working cast with an indicating material which is transferable to said casting on contact therewith, repeatedly closing and opening said arms to bring said surfaces of said functional cast in contact with the occlusal surface of said casting and thereby transferring said indicating material to said occlusal surface to indicate the high portions thereon.

11. A method of producing dental restorations, comprising providing a dental alignment holder having a pair of spaced arms mounted for relative rectilinear opening and closing movement with respect to each other and having a metallic block on each of said arms positioned to be in noise producing contact with each other by the movement of said arms into closed position, mounting on one of said arms a dental working cast representing a portion of the patient's teeth prepared for receiving a dental restoration and having a casting mounted thereon of said dental restoration, mounting on the other of said arms a dental functional cast in alignment with said working cast and having surfaces representing the mastication movements of the teeth opposite the prepared teeth, coating said surfaces of said working cast with an indicating material which is transferable to said casting on contact therewith, repeatedly closing said arms and tapping said blocks together to bring said surfaces of said functional cast in contact with the occlusal surface of said casting and thereby transferring said indicating material to said occlusal surface to indicate the higher portions thereon.

References Cited in the file of this patent

UNITED STATES PATENTS 2,674,797 Skinner _____ Apr. 13, 1954

FOREIGN PATENTS 251,531 Switzerland _____ Aug. 2, 1948